(12) United States Patent
Miranda et al.

(10) Patent No.: US 8,006,074 B1
(45) Date of Patent: Aug. 23, 2011

(54) METHODS AND APPARATUS FOR EXECUTING EXTENDED CUSTOM INSTRUCTIONS

(75) Inventors: Tracy Miranda, High Wycombe (GB); Steven Perry, Wycombe (GB)

(73) Assignee: Altera Corporation, San Jose, CA (US)

( * ) Notice: Subject to any disclaimer, the term of this patent is extended or adjusted under 35 U.S.C. 154(b) by 579 days.

(21) Appl. No.: 10/745,987

(22) Filed: Dec. 24, 2003

(51) Int. Cl.
*G06F 9/00* (2006.01)
(52) U.S. Cl. .......................... 712/225; 712/34
(58) Field of Classification Search ............... 712/34, 712/43, 227; 71/34, 225
See application file for complete search history.

(56) References Cited

U.S. PATENT DOCUMENTS

| 5,115,500 | A | * | 5/1992 | Larsen | 712/209 |
| 5,652,875 | A | | 7/1997 | Taylor | |
| 6,052,773 | A | * | 4/2000 | DeHon et al. | 712/43 |
| 6,477,697 | B1 | | 11/2002 | Killian et al. | |

OTHER PUBLICATIONS

Michelle Dolle, Manfred Schlett, "A Cost-Effective RISC/DSP Microprocessor for Embedded Systems", Oct. 1995, Hyperstone Electronics, p. 35-36.*
Kamemaru et al.; "Media processor core architecture for realtime, bi-directional MPEG4/H.26X Codec with 30 fr/s for CIF-video"; 2000; IEEE.*
Nios®, "Nios Custom Instructions, Tutorial" by Altera Corporation Doc. Version 1, Jun. 2002, 38 pages.

* cited by examiner

*Primary Examiner* — Alford W Kindred
*Assistant Examiner* — Benjamin P Geib
(74) *Attorney, Agent, or Firm* — Weaver Austin Villeneuve & Sampson LLP

(57) ABSTRACT

Methods and apparatus are provided for efficiently executing extended custom instructions on a programmable chip. Components of a processor core such as arithmetic logic units, program sequencer units, and address generation units are integrated with customizable logic blocks. Various customizable logic blocks can be invoked in a pipelined manner using an available customized instruction set while allowing a processor to continue simultaneous operation. Program counter snooping is also provided to add custom instruction functionality to a processor with no additional provisions for adding custom instructions.

29 Claims, 10 Drawing Sheets

METHODS AND APPARATUS FOR EXECUTING EXTENDED CUSTOM INSTRUCTIONS

CROSS REFERENCE TO RELATED APPLICATIONS

This application is related to concurrently filed U.S. patent application Ser. No. 10/745,986, titled "Extended Custom Instructions," the entirety of which is incorporated by reference for all purposes.

BACKGROUND OF THE INVENTION

1. Field of the Invention

The present invention relates to processors. In one example, the present invention relates to improving mechanisms and techniques for executing custom instructions associated with a processor.

2. Description of the Prior Art

A number of benefits have spurred efforts towards developing programmable chips having both logic elements and a processor core. In one example, integrating processor cores with logic elements on a single programmable chip allows efficient and effective processing using a variety of different logic mechanisms and functions. In one example, programmable chips are provided with not only logic elements and memory, but with processor cores and other components as well. Integrating processor cores and other components onto a programmable chip allows designers to more efficiently implement descriptions on programmable devices by allowing some functions to be performed by a processor core and other functions to be performed using logic elements.

The processor on the programmable device has an instruction set allowing software implementation of certain operations using the instructions in the instruction set. Other components on the programmable device implemented using logic elements may be invoked as hardware operations. In certain instances, it is desirable to customize an instruction set to allow software implementation of selected operations in a more efficient manner. For example, it may be desirable to include a 40-bit multiply in the instruction set of a 32-bit processor. Although a 40-bit multiply could be performed using a sequence of standard 32-bit instructions, it may be less efficient than implementing a custom instruction for performing a 40-bit multiply.

However, mechanisms and techniques for integrating custom instructions into the instruction set of a processor are limited. It is therefore desirable to provide improved methods and apparatus for optimizing implementation of customizable processor cores on programmable chips.

SUMMARY OF THE INVENTION

Methods and apparatus are provided for efficiently executing extended custom instructions on a programmable chip. Components of a processor core such as arithmetic logic units, program sequencer units, and address generation units are integrated with customizable logic blocks. Various customizable logic blocks can be invoked in a pipelined manner using an available customized instruction set while allowing a processor to continue simultaneous operation. Program counter snooping is also provided to add custom instruction functionality to a processor with no additional provisions for adding custom instructions.

In one embodiment, a programmable chip is provided. The programmable chip includes memory, a custom logic block, and a processor core. The custom logic block is operable to perform one or more custom instructions. The processor core ius coupled to memory and configured to receive an instruction sequence including supported and custom instructions. The processor core is operable to call the custom logic block when a custom trigger instruction is identified while processing supported instructions simultaneously.

In another embodiment, a method for processing custom instructions is provided. A plurality of supported instructions and custom instructions are received at a processor core of a programmable chip. A custom logic block integrated on the programmable chip is called when a custom trigger instruction is received while processing supported instructions simultaneously. The custom logic block is operable to execute one or more custom instructions.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which illustrate specific embodiments of the present invention.

DETAILED DESCRIPTION OF SPECIFIC EMBODIMENTS

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. For example, the techniques of the present invention will be described in the context of particular processor components.

However, it should be noted that the techniques of the present invention can be applied to a variety of processor units. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Conventional programmable chips include logic that can be customized for specific applications based on the needs of a particular user. Examples of programmable chips include programmable logic devices (PLDs) and field programmable gate arrays (FPGAs). Programmable chips offer advantages over more specialized application-specific integrated circuits (ASICs), such as significant cost savings in non-mass market applications. ASICs are custom-designed integrated circuits for specific usages. Because ASICs are custom-designed, they are often faster compared to programmable chips. However, the process of designing, verifying, fabricating, and testing ASICs is time-consuming and expensive. Any flaw uncovered on a particular ASIC after fabrication is complete requires a vast amount of time and expense to correct. Furthermore, ASICs are not programmable. An ASIC fabricated for specific digital signal processing (DSP) applications can not be reconfigured if the specific applications change.

Programmable chip implementations are sometimes slower than comparable ASIC implementations because the logic programmed onto a programmable chip is generally not optimized as well as customized logic on an ASIC. Consequently, ASICs have often been used in mass-market as well as performance sensitive applications. The desire to increase programmable chip performance has led to the integration of specialized resources along with logic elements on a programmable chip as well as the integration of custom instructions into the instruction set of a processor. In one particular example, resources such as customizable processor cores have been provided along with logic elements on a single programmable chip.

Commonly used functions that can take advantage of processor cores include finite impulse response (FIR) filters and fast Fourier transform (FFT) functions. Many of these functions frequently use the multiplier as a fundamental building block and specialized operations such as multiply-add and multiply-accumulate as supplemental building blocks. Certain operations such as a specialized multiply-add operations can be configured using logic elements. However, the speed and efficiency of the configuration may not be optimal. The specialized multiply-add operations can also be performed using a sequence of standard instructions in the processor core instruction set. However, the speed and efficiency of the configuration may again be non-optimal. For example, it may take a processor core a number of clock cycles to complete the operation.

Consequently, it is beneficial to provide customizable processor core that includes the specialized multiply-add as a custom instruction in the instruction set of the processor core. The custom instruction could then be invoked using software to perform a variety of operations. A processor on a programmable chip is referred to herein as a processor core while a piece of a processor or a component of the processor is referred to herein as a processor element, unit, or component.

However, mechanisms for integrating the functionality of custom logic blocks with processor core units to increase customizability of a processor instruction set are relatively limited. A processor typically has a relatively standard instruction set available for software applications to use. Logic elements can be configured as components that can be invoked as hardware components. However, it is often beneficial to increase the standard instruction set of a processor core to include customized instructions. In many instances, custom instructions included in a processor instruction set can be implemented using logic elements. Typically, however, custom logic blocks are either poorly integrated or cause inefficiency and stalls in processor operation.

Consequently, the techniques of the present invention provide a processor with customizable instructions to allow users to accelerate time-critical processes using custom logic more efficiently, powerfully, and flexibly. In some examples, the mechanisms of the present invention integrate processor components such as address generation units, program sequencing units, and arithmetic logic units with custom logic blocks in a manner that makes the custom logic part of the processor component set. A programmable chip can then be optimized more effectively to suit user specifications.

Figure 1:
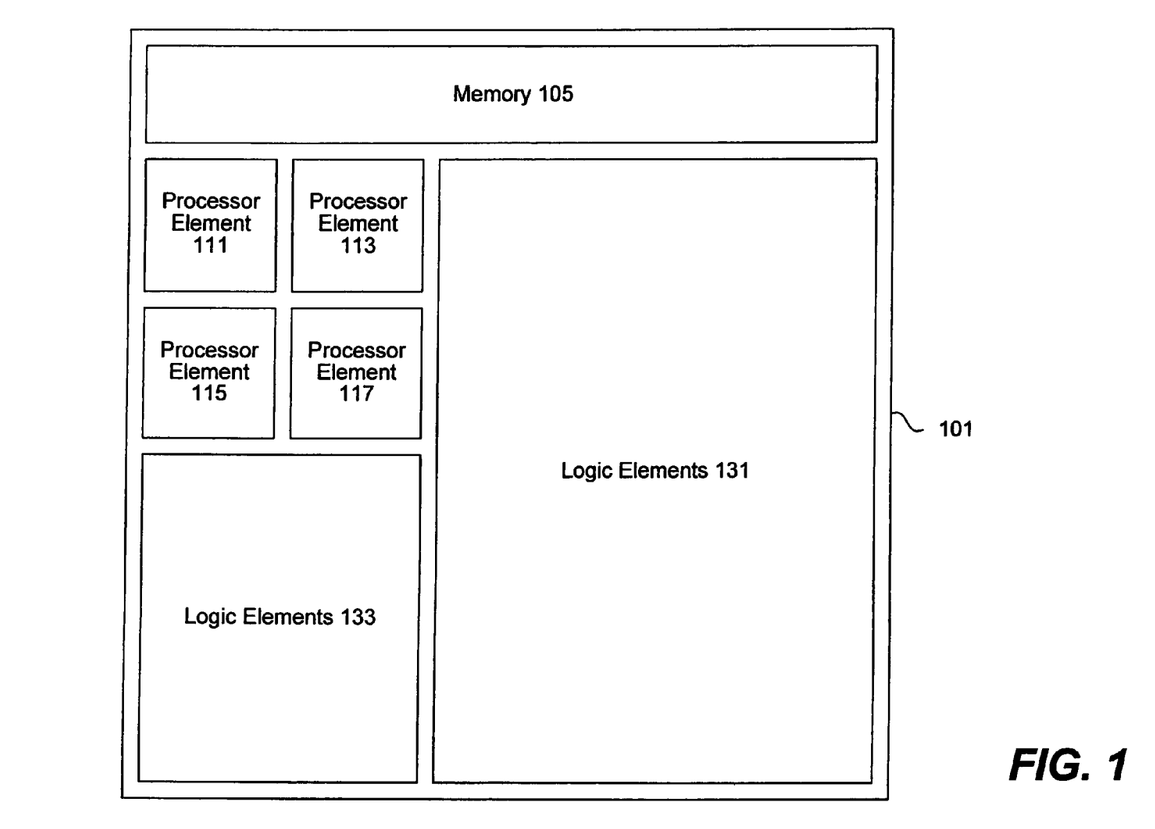
FIG. 1 is a diagrammatic representation showing a programmable chip having a processor core.

FIG. 1 is a diagrammatic representation of a programmable chip that can be used with the techniques of the present invention. In some examples, a programmable chip includes different types of resources that can be interchangeably used in different allocations to implement the same logic blocks. In one example, the heterogeneous programmable chip includes memory 105, logic elements 131 and 133, and processor elements 111, 113, 115, and 117. It should be noted that various components such as processor elements 111, 113, 115, and 117 are optional. The programmable chip does not need these elements incorporated. A variety of different components can be assembled to form a processor core. Instead of providing a generic processor core on a programmable chip, different components are provided to allow customization of the processor core.

In some examples, shifters, multiply accumulate units (MACs), address generation units, program sequencing units, and arithmetic logic units (ALUs) are provided as components that can be assembled. The shifters, MACs, address generation units, program sequencing units, and ALUs can be parameterized to allow further customization of the processor core. In some instances, the components of a processor core may not optimally implement various processes needed by a particular application. For example, a processor core even properly parameterized may not be ideal for performing addressing for various MPEG encoding and decoding algorithms. Similarly, a processor core may not be ideal for performing Fast Fourier Transforms (FFTs).

Consequently, customized logic blocks are often implemented. Customized logic can be configured using various logic elements and lookup tables to perform specific tasks.

It should be noted that although the techniques of the present invention will be described in the context of processor cores and logic elements, a variety of resources may be available on a programmable chip. For example, some other resources include phase locked loops (PLLs) and multiplexers (MUXes). Logic elements 131 typically can be implemented using components such as antifuses, static RAM, and EPROMS. Any mechanism in a programmable chip that performs an operation on a given number of input lines to provide one or more outputs based on information programmed is herein referred to as a logic element. Some logic elements are implemented as combinations of look up tables and switches for performing Boolean operations on input lines. In one example, a logic element includes a 16-bit SRAM lookup table (LUT) that can implement an arbitrary 4-input logic function, circuitry that forms a fast carry chain and a fast cascade chain, a register and preset/reset logic for the register.

Figure 2:
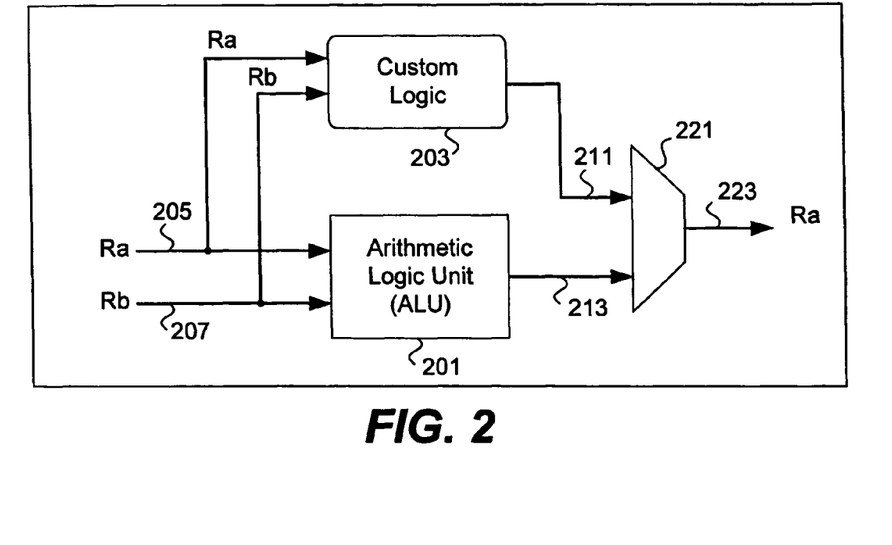
FIG. 2 is a diagrammatic representation showing a programmable chip having custom logic associated with an arithmetic logic unit.

FIG. 2 is a diagrammatic representation showing an arithmetic logic unit associated with custom logic. An ALU 201 and a custom logic block 203 share input lines 205 and 207 carrying register data. Custom logic block 203 provides output line 211 to a multiplexer 221. ALU 201 provides output lines 213 to multiplexer 221. For clarity, control lines are not shown in FIG. 2. Using control logic, the multiplexer can then select either the output of the ALU 201 or the output of the custom logic block 203. The data can be written to a register through output line 223.

In many implementations, the processor core on the programmable chip includes an ALU 201. A customizable processor core includes a custom instruction feature that allows system designers to accelerate time critical software algorithms by adding custom defined functionality to the processor's ALU and instruction set by providing custom logic block 203. A custom logic block 203 is typically implemented using logic elements.

In one example, a customizable processor core allows up to five user defined custom logic blocks, that then form part of the processors core's ALU 201. The custom logic blocks perform user defined operations on the contents of two registers provided through input lines 205 and 207, eventually providing the output to one of the two registers through output line 223. In some examples, the five user defined custom logic blocks each have an associated operation code or opcode.

The custom instruction block 203 can be combinatorial or sequential. A combinatorial custom logic block 203 takes one processor clock cycle to perform the instruction, while a sequential custom logic block takes more than one processor clock cycle to perform the instruction. In typical instances, a sequential custom logic block will stall the processor for the number of clock cycles it takes to perform the instruction. That is, the processor associated with the ALU 201 will wait until the custom logic block 203 has completed processing.

The techniques and mechanisms of the present invention provide additional improvements to processor cores to further enhance customizability. The techniques and mechanisms of the present invention allow custom logic blocks to replace other processor core components, such as address generation units and program sequencing units. Furthermore, stalls caused by the introduction of custom logic blocks are prevented while increasing flexibility to process the type and number of operands.

Figure 3:
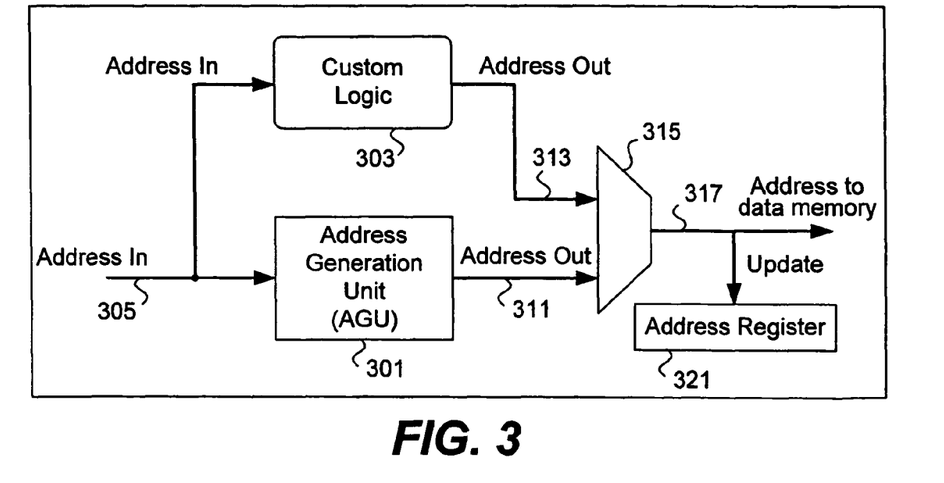
FIG. 3 is a diagrammatic representation showing a programmable chip having custom logic associated with an address generation unit.

FIG. 3 is a diagrammatic representation showing an address generation unit having an associated custom logic block. An address generation unit (AGU) 301 and a custom logic block 303 share input line 305 carrying address information. Custom logic block 303 provides output line 313 to a multiplexer 315. AGU 301 provides output line 311 to multiplexer 315. For clarity, control lines are not shown in FIG. 3. Using control logic, the multiplexer can then select either the output of the AGU 301 or the output of the custom logic block 303. The address can then be used to access data memory. The address can also be used to update an address register 321.

In many devices used for signal processing applications, address registers are treated separately from data registers. Address registers have specialized functionality useful for accelerating digital signal processing (DSP) algorithms, such as auto increment/decrement, modulo addressing and bit reversed addressing. As a result, DSP processors often have dedicated address generation units to handle this added functionality.

However, typical processor cores do not have specialized addressing capabilities, or have a limited set of addressing capabilities. To extended addressing functionality, the techniques of the present invention provide a custom instruction interface for the AGU 301. According to various embodiments, using a custom logic block 303 involves passing the address value on input line 305 that would otherwise be processed by the AGU 301 to the custom logic block 303. The custom logic block determines the address and returns the new value for the address along line 313. The lines 313 and 311 are then multiplexed using multiplexer 315 back into the address path 317. As with the ALU, this multiplexer would be controlled by the instruction opcode. The returned custom address value on line 317 can then be used to make an access to data memory. The value of the address produced by the custom instruction block may also be used to update the original address register 321. The user can choose whether the new address value produced acts just as a pre-modification of the address register or it does indeed update the actual stored value of the register.

This provides several benefits in that it would allow users to define their own address computations or complex addressing sequence that would otherwise take several instructions to implement in software using the address generation unit 301 of the processor core.

According to various embodiments, an instruction set can include operation codes for selecting either the use of the address generation unit 301 or the use of the custom logic block 303. In one example, an address generation unit 301 instruction can be formatted in the following manner:

LD d0, [a0.circ]

where LD is the load instruction, d0 is the destination register, [a0] denotes the memory location pointed to by address register a0 and circ refers to the special addressing mode used with circular buffers.

A custom logic block 303 instruction can be formatted in a similar manner:

LD d0, [a0.cust]

where LD is the load instruction, d0 is the destination register, [a0] denotes the memory location pointed to by address register a0 and cust refers to the special addressing mode provided by the custom instruction logic.

According to various embodiments, the custom instruction interface can be used to pass or set state information for the address custom instruction. For example, a custom address interface could be used to accelerate encoding and decoding using the JPEG/MPEG zigzag scanning algorithms. Zigzag scanning typically entails an atypical diagonal traversal of 2D arrays.

Figure 4:
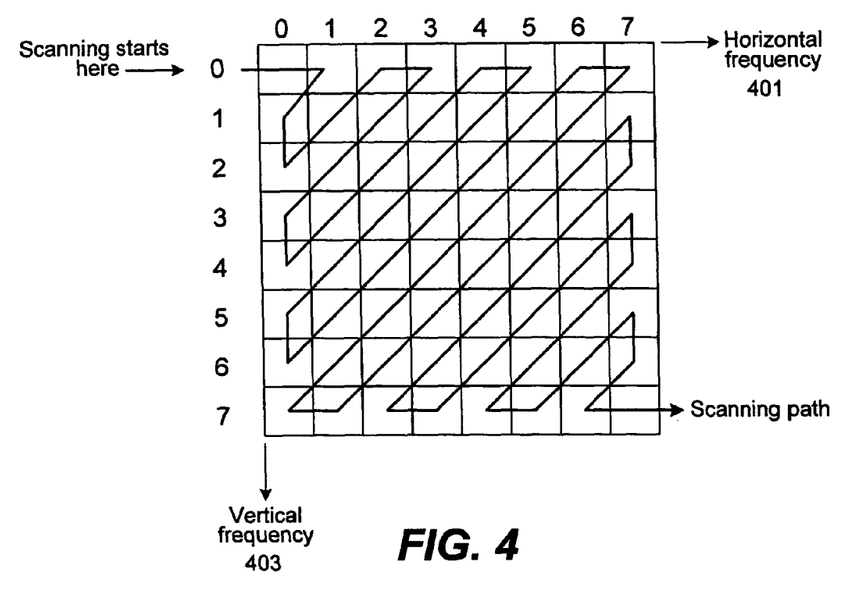
FIG. 4 is a diagrammatic representation showing zigzag scanning for the MPEG algorithm.

FIG. 4 is a diagrammatic representation showing zigzag scanning. An 8×8 matrix of MPEG coefficients is shown with horizontal index 401 and vertical index 403. Higher frequency coefficients of a particular matrix are shown in the top left corner of the matrix while lower frequency components are shown in the bottom right. By using zigzag scanning, higher frequency components can be scanned first. In some cases, lower frequency components, or components that the human eye is less sensitive to are filtered and scanning of the entire matrix is not needed.

Zigzag scanning typically requires some intelligence in configuring the addressing logic. Typical mechanisms for performing zigzag scanning with a noncustomizable address generation unit include using several loops to handle addressing, using a lookup table, or coding the addressing into the algorithm. Each of these techniques has drawbacks. Using several for loops to handle the correct address sequence, i.e. (0,0), (0,1), (1,0), (1,1), (0,2) . . . , would require several instructions and consequently would take several cycles to execute. Using a look up table to index to the next correct address would incur an extra bus access to the look up table, as well as additional memory needed to store the lookup table. Using an algorithm with the address sequence hardcoded would result in increased code size, which may affect performance, particularly if the code block then becomes too large to fit in the cache.

Consequently, the techniques of the present invention contemplate using a custom address instruction interface. The algorithm for the zigzag scanning would reduce to the following:

```
LD d0, [a0.cust]        ; read in next value
<process value>         ; process value
LOOP m, zigzag_scan     ; loop m times
``` where LD is the load instruction, d0 is the destination register, [a0] denotes the memory location pointed to by address register a0 and cust refers to the custom addressing mode used to perform zigzag scanning.

According to various embodiments, user defined logic can be used to determine the complex sequence of address updates to follow the zigzag pattern. No software would be needed to determine the next address value. This would result in greatly simplified and efficient code as well as faster performance of any JPEG/MPEG encoding or decoding algorithm.

Figure 5:
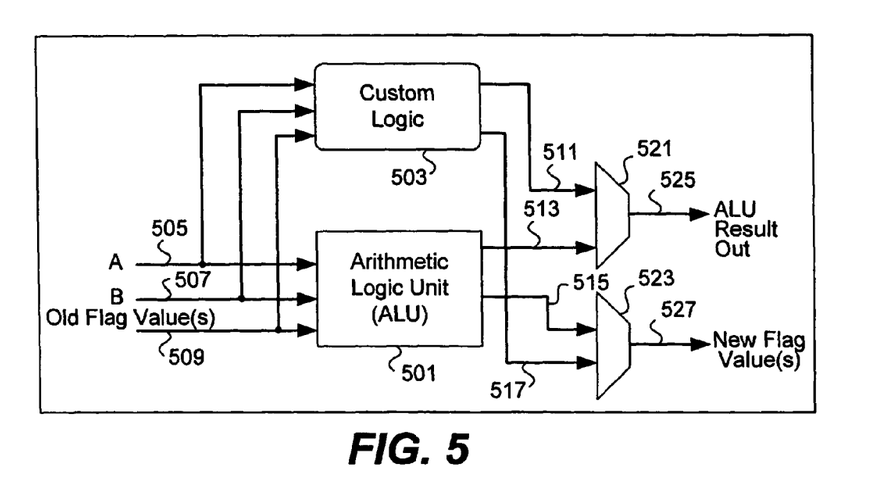
FIG. 5 is a diagrammatic representation showing a programmable chip having a conditional custom instruction interface.

Providing a custom logic block allows implementation of specialized addressing schemes. Custom logic blocks can also be used as a conditional custom instruction interface. FIG. 5 is a diagrammatic representation showing a conditional custom instruction interface.

Many processors are configured to handle a particular number of bits. For example, an processor can be a 16-bit RISC processor or a 32-bit RISC processor. A 32-bit RISC processor has 32-bit data path and is capable of performing operations on 32-bit numbers. For example, an arithmetic logic unit within the 32-bit RISC processor would be operable to subtract a 32-bit number from another 32-bit number and place the result in a 32-bit register. However, some results or intermediate results of processor operations on 32-bit numbers can not be fully represented in a 32-bit result. That is, a result may be a 33-bit number that can not be represented with the available hardware (e.g. 32-bit register).

Consequently, processors typically have flags such as carry and overflow flags that are used to hold state information. Typically these flags or status bits are set by the operations that the processor supports. For example, the carry bit is often set by an ADD operation. The flags are often used in processors to then conditionally perform certain ALU operations. In typical instances, flags are stored in registers which must be then read during additional clock cycles.

According to various embodiments, the techniques of the present invention provide a flag value 509 that is passed both to the ALU 501 as well as the custom logic block 503. The flag value 509 is passed along with values 505 and 507. Data output lines 513 and 511 are multiplexed at 521 and a data result out is provided at 525. A new flag value is provided by ALU 501 and custom logic block 503 on lines 515 and 517 respectively and multiplexed at 523 to provide a new flag value 527. Control lines are omitted for clarity. In one example, two 32-bit numbers are processed by either ALU 501 or custom logic block 503 with no carry bit set. However, the result of the operation yields a carry bit and the new flag value consequently is set along line 527 and provided with a data value along line 525.

The conditional custom instruction interface shows how in addition to the ALU operands, one or more flag values are passed to the custom logic block. These values can either be just read and used by the custom logic, or if the user desires, can also be updated in a user defined way. Both the result of the custom logic and the new flag values are then multiplexed back into the processors data path.

The interface provides several benefits. The flag value being passed into the custom logic allows conditional execution of the custom instruction based on the previous instruction that set the value of the flag. Furthermore, the return path for the flag value would allow the status bits of the processor to be set in a user defined way. The set flag will allow the processor to react to that special case in the next instruction. These benefits would allow for a powerful way to implement complex if/then/else statements in a highly efficient manner.

The following example illustrates the benefit of setting a flag in a user defined way. This interface would, for example, allow one to optimize the following piece of code, which performs a compare select operation.

if (a>b) store a; decision bit=0;
else store b; decision bit=1;

With just the ALU custom instruction interface, the compare and select could be implemented in custom logic as illustrated below. However, while this would easily determine the greater value to be stored, it does not easily return information needed to set the decision bit. To determine the information needed to set the decision bit, several actions could be performed. In one instance, if some bits of the return value are not being used, the decision bit could be passed back to the calling program by placing the flag in the data value. However, this would still require instructions to extract it to store it or set the flag based on its value. In another instance, if the decision bit can not be returned as part of the return value, determining the flag would either require either another custom instruction to just return the decision bit or additional instructions would be used to determine which value is returned and whether or not to set or clear the decision bit. The technique incur additional clock cycles and reduce the benefit gained by using custom logic.

Figure 6A:
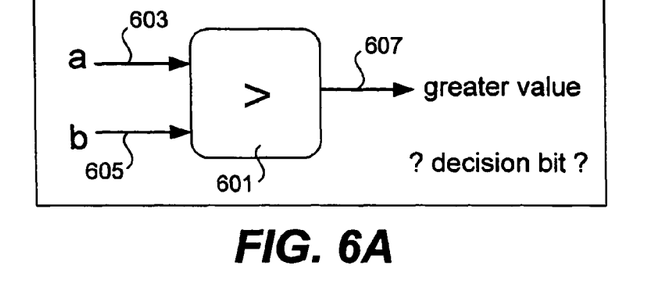
FIGS. 6A and 6B are diagrammatic representations showing results of a conditional custom instruction interface.

FIG. 6A shows such an interface to compare-select custom instructions without return flag bits. Operands along lines 603 and 605 are processed at 601 to provide result along line 607. Such an interface typically incurs additional clock cycles. However, using the conditional custom interface, the flag value could be set to indicate the result of the compare. The flag value could then be used to conditionally set or clear the value of the decision bit.

Figure 6B:
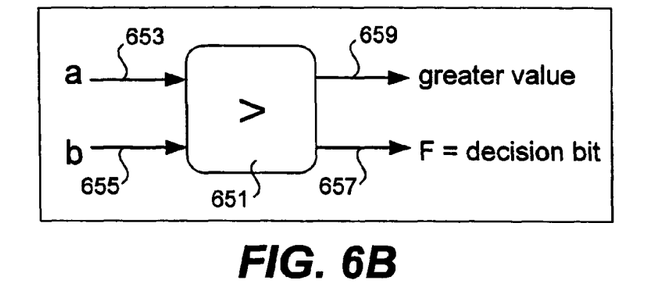

FIG. 6B shows an interface to compare-select custom instructions with return flag bits. Operands along lines 653 and 655 are processed at 651 to determine result 659 and a decision bit 657. In one example, it is determined whether a value along line 653 is greater than a value along line 655. The greater of the two values is provided along line 659 and the decision bit is provided along line 657.

The interface supporting flag bits can be extended to be used as custom logic for add-compare select operations. Add-compare select operations are part of the Viterbi butterfly algorithm, which is used in equalizers and channel decoders. Again, the add-compare select operation could be implemented using just the ALU custom instruction interface, but this would not easily return the decision bit. In the Viterbi algorithm, the saved decision bits store the most likely state sequence the encoder went through in encoding the message. The bits are used in the trace-back part, where the original message is decoded by following the optimal path that was determined. Without a conditional interface to return a decision bit, it would require additional instructions and clock cycles.

One example can be performed as follows:

| | |
|---|---|
| CUSTY x, a, b | ; perform custom add compare select on a, b ; with result in x and set f flag value |
| [F] ST decision bit, 0, 1 | ; conditional store based on flag bit |
| ST result, x | ; store result of add compare select |

Still another processor core component that can benefit from having a custom instruction interface is a program sequencer. Program sequencers typically generate program counter information for a processor core. In many instances, program sequencers determine the next instruction based on sequential or branching mechanisms.

Figure 7:
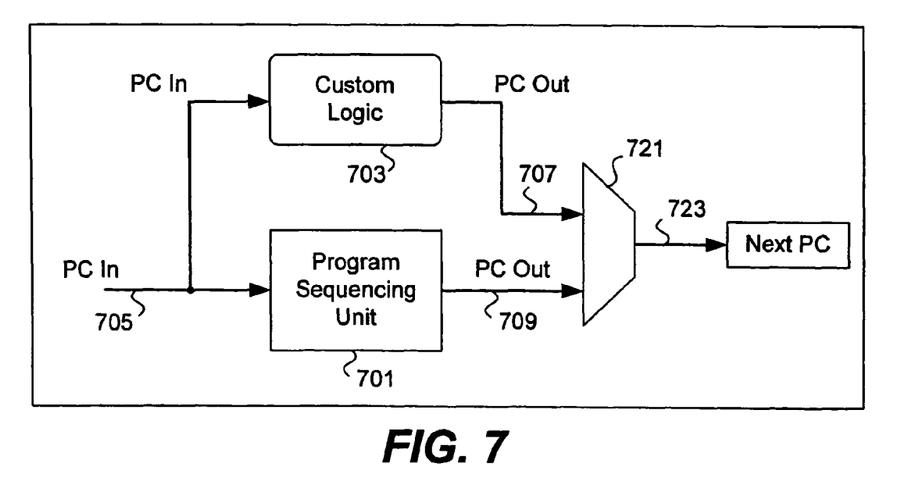
FIG. 7 is a diagrammatic representation showing a programmable chip having custom logic with a program sequencing unit.

FIG. 7 is a diagrammatic representation showing a program sequencing unit associated with a custom logic block. Program sequencing unit 701 and custom logic block 703 share input line 705. Custom logic block 703 provides a program counter output 707 to multiplexer 721 while program sequencing unit 701 provides a program counter output 709 to multiplexer 721. Control circuitry then selects an appropriate output and sets the next program counter value 723.

According to various embodiments, the current program counter 705 is passed through custom logic block 703 that generates and returns the updated program counter pointing to the location of the next instruction. Custom instruction techniques can be used to generate the next instruction for the program sequencer in a manner more specialized then a general branch value or sequential value.

The techniques of the present invention allow complex multiple way branching operations to be compiled into a hardware function. Furthermore, any number of operands or state values can be used to generate the next instruction to execute. The interface allows a complex state machine to generate interrupts, for example.

Custom instructions improve the operation of a programmable chip. Custom instructions can be invoked in a variety of manners. In a typical processor pipeline, a custom instruction will be invoked and the processor will wait until the custom logic block completes processing. The processor core waits even though the custom logic block may be implemented entirely using logic elements without any need for processor handling. Consequently, custom instructions are typically best used when they implement a tightly coupled operation that is akin to a regular processor instruction. That is, they supplement the processor with instructions that are more domain specific. Sometimes, however, custom instructions are too slow to implement in a single cycle. When custom instructions can not be implemented in a single clock cycle, a processor typically has to wait for a number of cycles until the result is ready.

Figure 8:
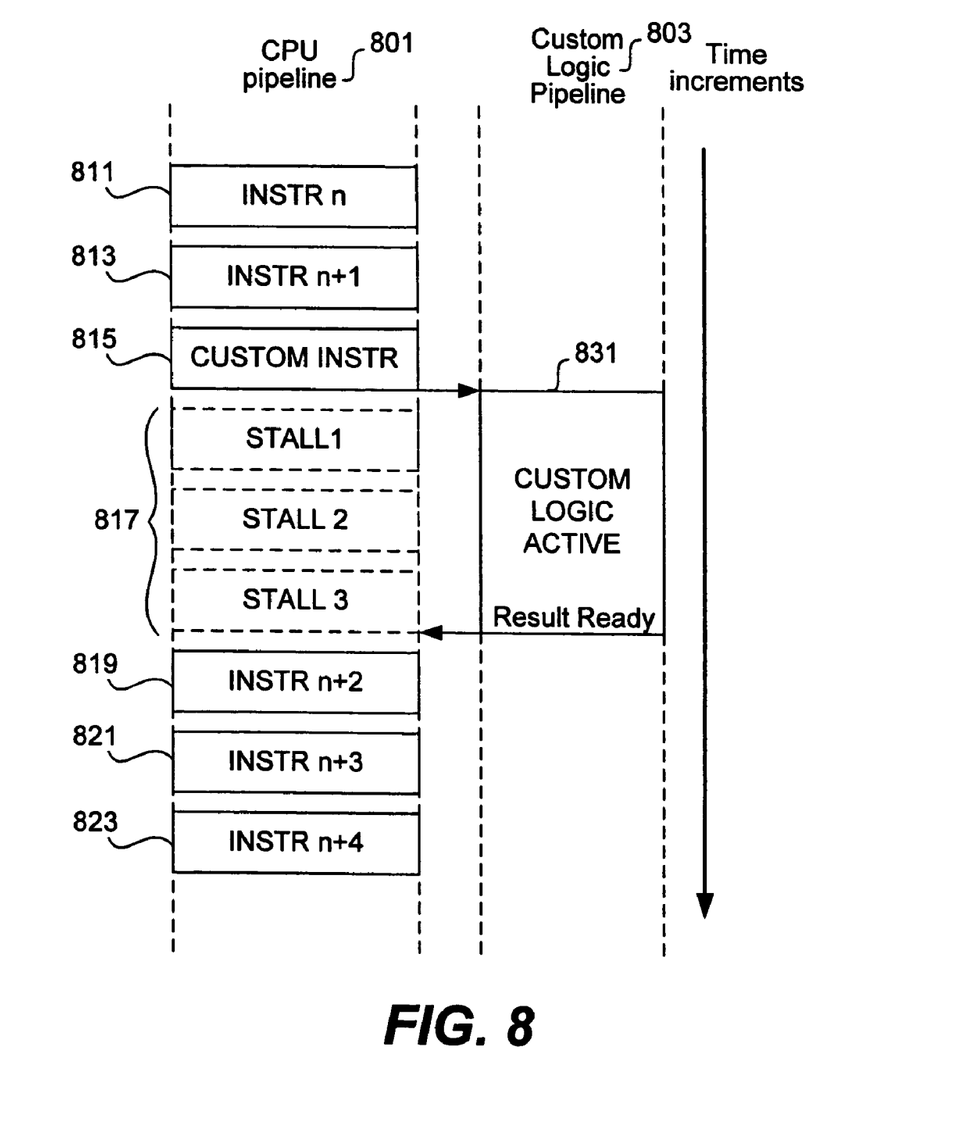
FIG. 8 is a diagrammatic representation showing a CPU pipeline and a custom logic pipeline.

FIG. 8 is a diagrammatic representation showing a processor stall. A processor pipeline 801 is associated with a custom logic pipeline 803. Instructions 811 and 813 are handled on the processor pipeline 801. A custom instruction invoking a custom logic block is called at 815. Custom logic 831 is then used to handle processing. However, the processor is stalled at 817 while it waits for the results of the custom logic block 831. When the results are ready, the processor can continue performing instructions 819, 821, and 823.

As noted above, the custom instruction is the third instruction of the sequence being illustrated. The execution of custom instruction 815 acts as a trigger to activate the custom instruction logic 831. The custom logic implementation takes multiple cycles, so while the custom logic is running the processor's pipeline is stalled and no more instructions are executed. The processor is stalled whether or not there are data dependencies between the processor pipeline 801 and the custom logic pipeline 803.

Inefficient stalling results if the custom instructions require several CPU cycles to process the data. Not only is the processor stalled, but only one set of operands can be processed at a time through the custom logic. As a result more complex custom logic has diminished benefit from being tightly coupled to the processor.

An alternative implementation would be to treat the custom instruction as a pipeline that takes in subsequent operands at the top and produces results at the bottom. This implementation makes use of two custom instructions per logic block instead of one. One instruction passes the operands to the first stage of the custom instruction logic, while the second instruction reads the result of the last stage of the custom instruction.

Figure 9:
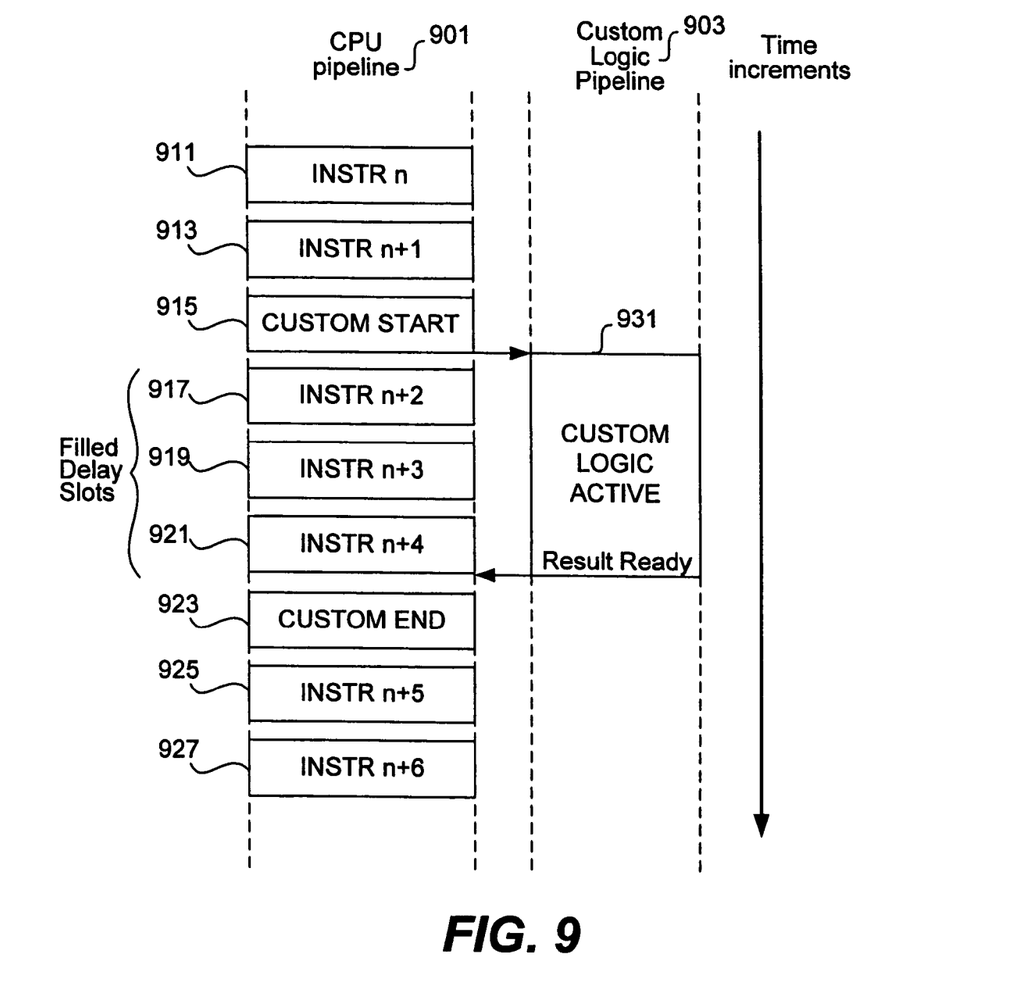
FIG. 9 is a diagrammatic representation showing a CPU pipeline and a custom logic pipeline with parallel execution.

FIG. 9 is a diagrammatic representation showing processor pipelines and custom logic pipelines operating in parallel. The processor pipeline 901 runs instructions 911 and 913 and invokes a custom logic instruction 915. When the custom logic instruction 915 is called, the instruction call is non-blocking, that is, the processor continues to process instructions. Any non-blocking call to a custom instruction block is referred to herein as a custom trigger instruction. While custom logic 931 is processing, other instructions 917, 919, and 921 can be processed instead of merely stalling the processor. A custom instruction end 923 is called to wait for the results of the custom logic block. Any instruction waiting for the results of a custom instruction block called using a custom trigger instruction is referred to herein as a custom end instruction. The processor can then proceed with processing instructions 925 and 927.

According to various embodiments, the custom instruction logic operates on a first in, first out basis so the results are returned in the order the operands were passed in. The processor will acknowledge when it reads out a value from the custom instruction logic. If the processor has not read out the result and the custom logic pipeline is full, the custom logic stalls until the result is read. The stalling of the custom logic block allows the processor to attend to the results when it wants to rather than having to do so at a particular fixed time.

The techniques of the present invention provide several benefits. As the processor is not stalled during the custom instructions, it may continue to execute other instructions in parallel with the custom instruction. Also, instead of waiting for the custom instruction to complete one operation, the processor can keep feeding operands to the logic to maintain maximum throughput. For example, a custom instruction with a 10 stage pipeline for floating point addition would previously take 100 cycles to perform 10 floating point additions. Using the techniques of the present invention, 10 floating point additions would take just 19 cycles. Furthermore, the techniques of the present invention do not do not indefinitely stall the processor. As a result, the custom instruction is interruptible. If the processor was stalled, the interrupt latency of the processor increases by the number of cycles stalled. Stalling would affect performance as it increases the worst case cycle count for various algorithms. However, by having a parallel pipelined interface, the custom instruction will not affect interrupt latency.

In the figure above, the custom instruction is the third instruction in the illustration. The custom trigger instruction invokes the user's custom logic operation. A second instruction, a custom end instruction is then used to read back the result of the custom logic. The instruction can be located at any point after the custom logic completes its operation. If the result is not read back immediately, the custom logic will stall until the CPU is ready for the results. The instruction slots between the two custom instructions can be treated as delay slots and used to execute any CPU instructions that do not rely on the result of the custom instruction. The parallel execution of instructions can greatly improve algorithm performance.

Figure 10:
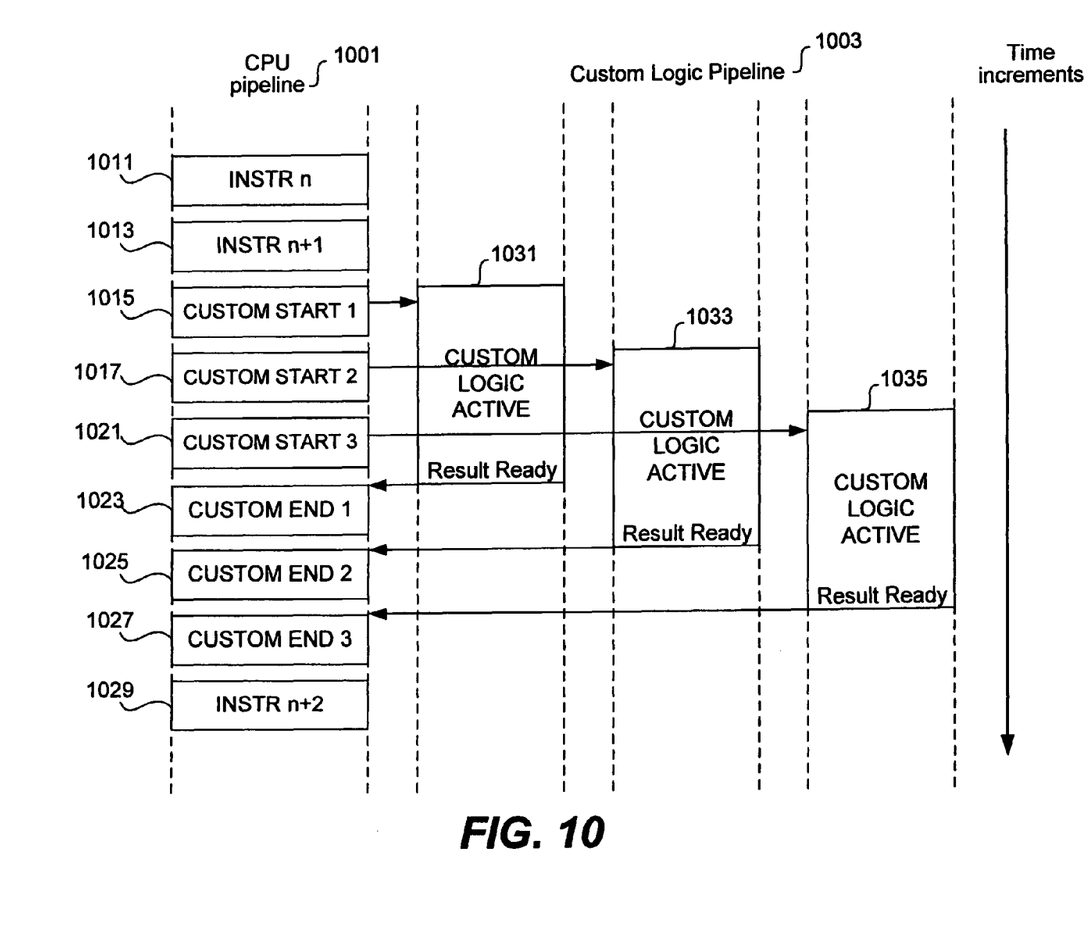
FIG. 10 is a diagrammatic representation showing a another CPU pipeline and a custom logic pipeline with parallel execution.

FIG. 10 is a diagrammatic representation showing multiple custom instruction pipelines. According to various embodiments, the same custom instruction is executed three times at 1015, 1017, and 1021 after executing instruction 1011 and 1013. The first custom start instruction 1015 passes the necessary operands to the custom instruction pipeline 1031. By the time the next instruction is ready to be executed, the custom logic is ready for another set of operands, even though it has not returned the first result. Consequently, the second custom start instruction 1017 can pass the necessary operands to the custom instruction pipeline 1033. and the third custom start instruction 1021 can pass the necessary operands to the custom instruction pipeline 1035. In this way three separate instances of the custom instruction are triggered and sequentially fed into the custom logic pipeline.

Likewise, the results of the operation are read back into the processor one after the other by consecutive custom end instructions 1023, 1025, and 1027, although the custom end instructions do not have to be consecutive. Without pipelining, the three custom instructions would take nine processor clock cycles, but now take just six cycles. This example shows the results being read back from the custom instruction as soon as they are ready by custom end instructions 1023, 1025, and 1027. This does not always have to be the case. The processor can proceed with executing other instructions such as instruction 1029 and read back the custom instruction results at a later point. The custom instruction logic can continue to accept operands until its pipeline is full, then stall until the pending result is read out. In this way the custom logic stalls waiting on the processor rather than the other way round.

Figure 11:
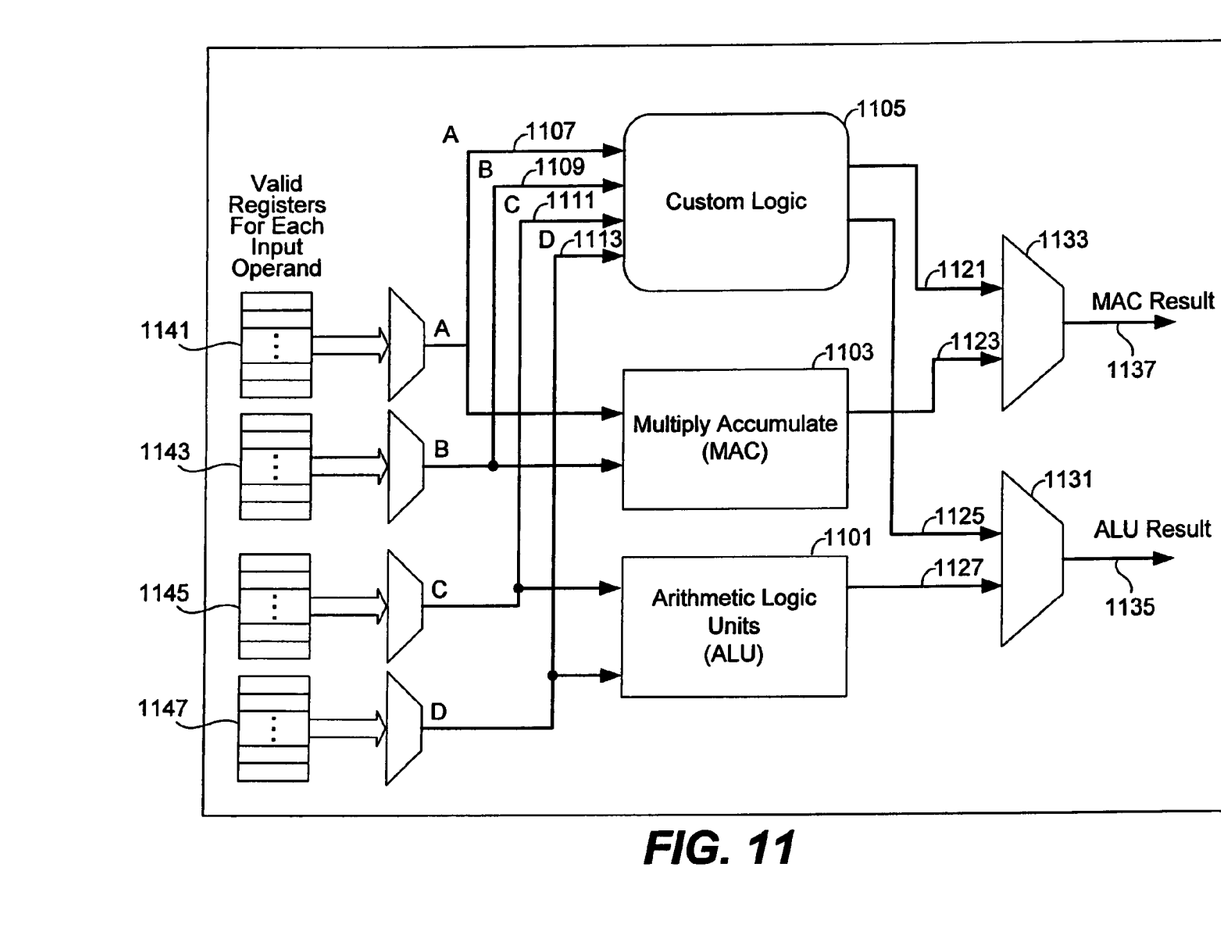
FIG. 11 is a diagrammatic representation showing multiple register input to custom instructions.

Custom logic blocks can also be configured to take multiple operands associated with different processor core components. FIG. 11 is a diagrammatic representation showing multiple register input to custom instructions. Register banks 1141 and 1143 pass data to custom logic block 1105 and multiply accumulate (MAC) unit 1103 through shared lines 1107 and 1109. Register banks 1145 and 1147 pass data to custom logic block 1105 and ALU 1101 through shared lines 1111 and 1113. A custom logic result 1121 is multiplexed with the MAC result 1123 at 1133 and provided as MAC results 1137. An ALU result 1127 is multiplexed at 1131 with the custom logic block result 1125 and provided as ALU result 1135.

A large number of operands can be selected from registers by the normal instruction decode logic. The registers would typically be feed to the ALU and MAC, but are also provided to the custom logic block 1105, making the values available for no logic overhead. Having more registers available for custom instruction inputs allows more flexibility of operation. For example, a complex multiply instruction can have all 4 operands, that is, real and imaginary parts of each input, read simultaneously. Reusing the register decode and selection logic to select operands for the custom instruction means the custom instructions do not incur additional restrictions, but the usage rules are the same as for the ALU and MAC functional units.

As noted above, operation codes or opcodes are typically used to identify whether processor core components or customized logic blocks should handle a particular operation. That is, custom instructions usually have dedicated opcodes which are decoded to trigger the custom instruction logic. However, in some instances, there may be an opcode shortage. An alternative approach is to snoop the program counter address. When a particular address is reached, the processor's registers can be captured and the custom instruction performed as before. The address to be detected is given by the linker when the software program is compiled, so the flow is very simple for the user.

Program counter snooping provides an extensible way to add custom instruction functionality to a processor with no provision for custom instructions in its instruction set or for one in which there is no more scope for extension. It also saves on decode logic for those opcodes and allows the processor to continue to perform its own operations in parallel with the custom instruction, giving rise to increased performance.

Program counter snooping can be performed on the following code:

```
program:
    <instr. 1 >
    <instr. 2>
    <instr. 3>
    CALL fpdiv    ; call floating point divide
    <instr. 4>    ; this instruction is executed in parallel with fpdiv
    <instr. 5>    ; this instruction is executed in parallel with fpdiv
fpdiv:            ; the address of this line triggers the fp divide custom
                  ; instruction
    RET           ; CPU executes this instruction.
```

For example, in the above piece of code the fpdiv label is located at an address being snooped for on the program counter. When the hardware detects the address, it calls the custom instruction logic for floating point divide. The custom instruction logic then executes in parallel with the rest of the program.

Although the techniques and mechanisms of the present invention can be implemented on a variety of electronic devices, the techniques and mechanisms are particularly applicable to processors implemented on programmable chips. A programmable chip provides flexibility in implemented customizable processor cores and custom instruction sets.

Figure 12:
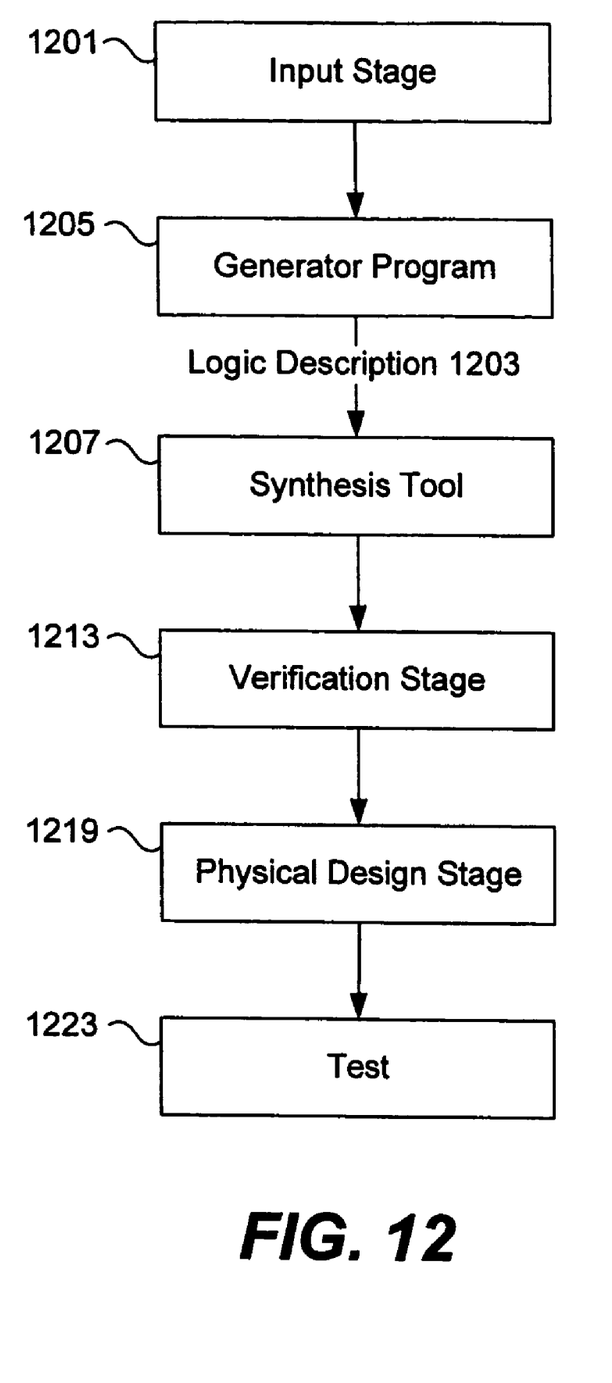
FIG. 12 is a diagrammatic representation showing a technique for implementing the programmable chip.

FIG. 12 is a diagrammatic representation showing implementation of an electronic device having a customizable processor core. An input stage 1201 receives selection information typically from a user for logic such as a processor core as well as other components to be implemented on an electronic device. A generator program 1205 creates a logic description and provides the logic description along with other customized logic to any of a variety of synthesis tools, place and route programs, and logic configuration tools to allow a logic description to be implemented on an electronic device.

In one example, an input stage 1201 often allows selection and parameterization of components to be used on an electronic device. In some examples, components provided to an input stage include intellectual property functions, megafunctions, and intellectual property cores. The input stage 1201 may be a graphical user interface using wizards for allowing efficient or convenient entry of information. The input stage may also be a text interface or a program reading a data file such as a spreadsheet, database table, or schematic to acquire selection information. The input stage 1201 produces an output containing information about the various modules selected.

In typical implementations, the generator program 1205 can identify the selections and generate a logic description with information for implementing the various modules. The generator program 1205 can be a Perl script creating HDL files such as Verilog, Abel, VHDL, and AHDL files from the module information entered by a user. According to various embodiments, the generator program 1205 also provides information to a synthesis tool 1207 to allow HDL files to be automatically synthesized. In some examples, a logic description is provided directly by a designer. Some of the available synthesis tools are Leonardo Spectrum, available from Mentor Graphics Corporation of Wilsonville, Oreg. and Synplify available from Synplicity Corporation of Sunnyvale, Calif. The HDL files may contain technology specific code readable only by a synthesis tool. The HDL files at this point may also be passed to a simulation tool 1209.

As will be appreciated by one of skill in the art, the input stage 1201, generator program 1205, and synthesis tool 1207 can be separate programs. The interface between the separate programs can be a database file, a log, or simply messages transmitted between the programs. For example, instead of writing a file to storage, the input stage 1201 can send messages directly to the generator program 1205 to allow the generator program to create a logic description. Similarly, the generator program can provide information directly to the synthesis tool instead of writing HDL files. Similarly, input stage 1201, generator program 1205, and synthesis tool 1207 can be integrated into a single program.

A user may select various modules and an integrated program can then take the user selections and output a logic description in the form of a synthesized netlist without intermediate files. Any mechanism for depicting the logic to be implemented on an electronic device is referred to herein as a logic description. According to various embodiments, a logic description is an HDL file such as a VHDL, Abel, AHDL, or Verilog file. A logic description may be in various stages of processing between the user selection of components and parameters to the final configuration of the device. According to other embodiments, a logic description is a synthesized netlist such as an Electronic Design Interchange Format Input File (EDF file). An EDF file is one example of a synthesized netlist file that can be output by the synthesis tool 1207.

A synthesis tool 1207 can take HDL files and output EDF files. Tools for synthesis allow the implementation of the logic design on an electronic device. Some of the available synthesis tools are Leonardo Spectrum, available from Mentor Graphics Corporation of Wilsonville, Oreg. and Synplify available from Synplicity Corporation of Sunnyvale, Calif. Various synthesized netlist formats will be appreciated by one of skill in the art.

A verification stage 1213 typically follows the synthesis stage 1207. The verification stage checks the accuracy of the design to ensure that an intermediate or final design realizes the expected requirements. A verification stage typically includes simulation tools and timing analysis tools. Tools for simulation allow the application of inputs and the observation of outputs without having to implement a physical device. Simulation tools provide designers with cost effective and efficient mechanisms for both functional and timing verification of a design. Functional verification involves the circuit's logical operation independent of timing considerations. Parameters such as gate delays are disregarded.

Timing verification involves the analysis of the design's operation with timing delays. Setup, hold, and other timing requirements for sequential devices such as flip-flops are confirmed. Some available simulation tools include Synopsys VCS, VSS, and Scirocco, available from Synopsys Corporation of Sunnyvale, Calif. and Cadence NC-Verilog and NC-VHDL available from Cadence Design Systems of San Jose, Calif. After the verification stage 1213, the synthesized netlist file can be provided to physical design tools 1219 including place and route and configuration tools. A place and route tool typically locates logic cells on specific logic elements of a target hardware device and connects wires between the inputs and outputs of the various logic elements in accordance with logic required to implement an electronic design. The device can also be physically tested at 1223.

For programmable logic devices, a programmable logic configuration stage can take the output of the place and route tool to program the logic device with the user selected and parameterized modules. According to various embodiments, the place and route tool and the logic configuration stage are provided in the Quartus Development Tool, available from Altera Corporation of San Jose, Calif. As will be appreciated by one of skill in the art, a variety of synthesis, place and route, and programmable logic configuration tools can be tested using various techniques of the present invention.

As noted above, different stages and programs can be integrated in a variety of manners. According to one embodiment, the input stage 1201, the generator program 1205, the synthesis tool 1207, the verification tools 1213, and physical design tools 1219 are integrated into a single program. The various stages are automatically run and transparent to a user. The program can receive the user selected modules, generate a logic description depicting logic for implementing the various selected modules, and implement the electronic device. As will be appreciated by one of skill in the art, HDL files and EDF files are mere examples of a logic description. Other file formats as well as internal program representations are other examples of a logic description.

Figure 13:
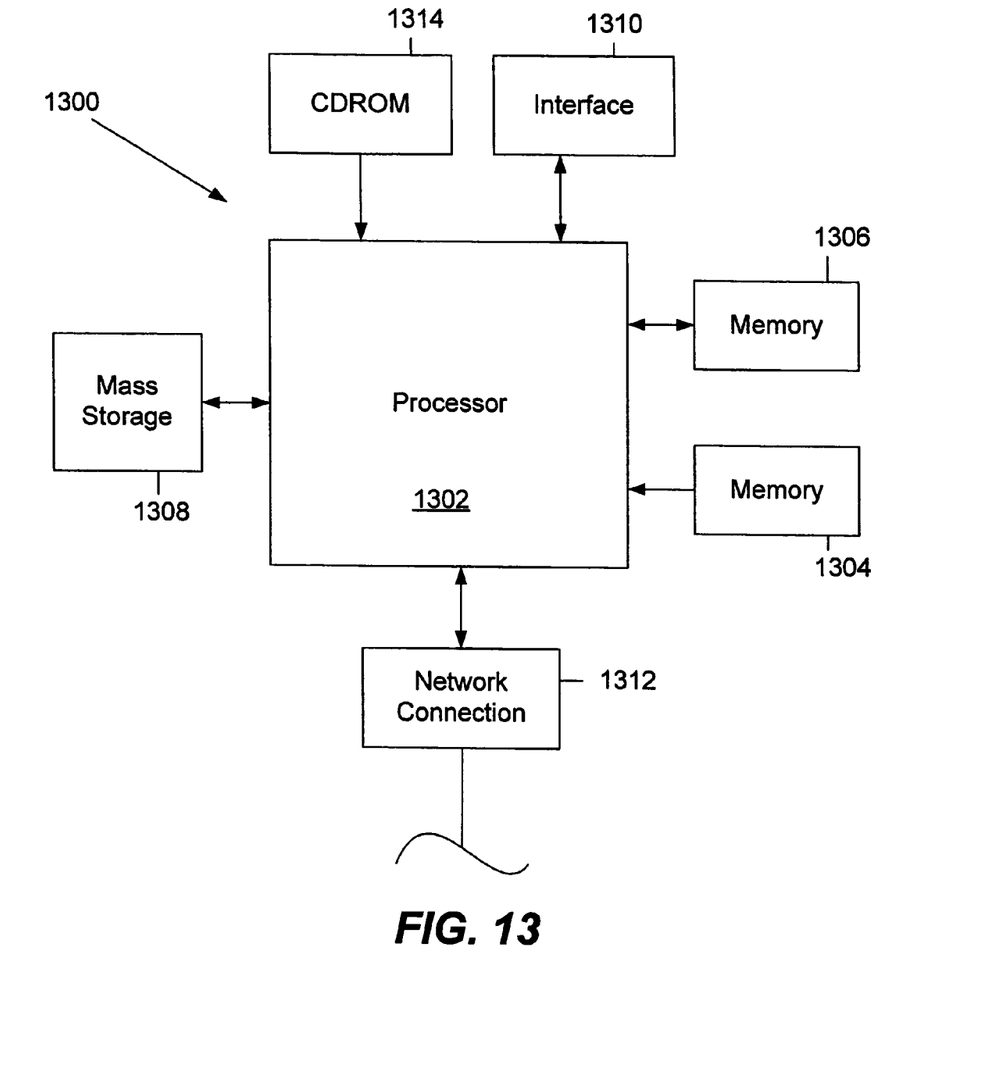
FIG. 13 is a diagrammatic representation of a computer system that can be used to implement the techniques of the present invention.

FIG. 13 illustrates a typical computer system that can be used to implement a programmable chip having a multi-threaded processor core. The computer system 1300 includes any number of processors 1302 (also referred to as central processing units, or CPUs) that are coupled to devices including memory 1306 (typically a random access memory, or "RAM"), memory 1304 (typically a read only memory, or "ROM"). The processors 1302 can be configured to generate a test sequences for any designated processor. As is well known in the art, memory 1304 acts to transfer data and instructions uni-directionally to the CPU and memory 1306 is used typically to transfer data and instructions in a bi-directional manner.

Both of these memory devices may include any suitable type of the computer-readable media described above. A mass storage device 1308 is also coupled bi-directionally to CPU 1302 and provides additional data storage capacity and may include any of the computer-readable media described above. The mass storage device 1308 may be used to store programs, data and the like and is typically a secondary storage medium such as a hard disk that is slower than memory. The mass storage device 1308 can be used to hold a library or database of prepackaged logic or intellectual property functions, as well as information on generating particular configurations. It will be appreciated that the information retained within the mass storage device 1308, may, in appropriate cases, be incorporated in standard fashion as part of memory 1306 as virtual memory. A specific mass storage device such as a CD-ROM 1314 may also pass data uni-directionally to the CPU.

CPU 1302 is also coupled to an interface 1310 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1302 optionally may be coupled to a computer or telecommunications network using a network connection as shown generally at 1312. With such a network connection, it is contemplated that the CPU might receive information from the network, or might output information to the network in the course of performing the above-described method steps. It should be noted that the system 1300 may also be associated with devices for transferring completed designs onto a programmable chip. The above-described devices and materials will be familiar to those of skill in the computer hardware and software arts.

The hardware elements described above may be configured (usually temporarily) to act as multiple software modules for performing the operations of this invention. For example, instructions for running a generator program, input stage (e.g., a wizard), and/or compiler may be stored on mass storage device 1308 or 1314 and executed on CPU 1308 in conjunction with primary memory 1306.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. For example, the embodiments described above may be implemented using firmware, software, or hardware. Moreover, embodiments of the present invention may be employed with a variety of different file formats, languages, and communication protocols and should not be restricted to the ones mentioned above. Therefore, the scope of the invention should be determined with reference to the appended claims.

What is claimed is:

1. A programmable chip, comprising;
   memory;
   a custom logic block operable to perform one or more custom instructions;
   a processor core coupled to memory, the processor core configured to receive an instruction sequence including supported and custom instructions, the processor core operable to call the custom logic block when a custom trigger instruction is identified while processing supported instructions simultaneously, wherein the processor core is an address generation unit and the custom logic block is a custom address generation unit configured to calculate zigzag scanning addresses for MPEG encoding;
   wherein the processor core distinguishes supported instruction from custom instructions by snooping a program counter address, wherein an address identifying a custom instruction to be detected is provided by a linker when a software program is compiled for execution on the processor core.

2. The programmable chip of claim 1, wherein the processor core is configured to wait for a response from the custom logic block when a custom end instruction corresponding to the custom trigger instruction is received.

3. The programmable chip of claim 1, wherein supported instructions are processed by the processor core and custom instructions are processed by the custom logic block in parallel.

4. The programmable chip of claim 1, further comprising a second custom logic block operable to perform one or more custom instructions.

5. The programmable chip of claim 4, wherein the processor core is operable to call the second custom logic block when a second custom trigger instruction is identified.

6. The programmable chip of claim 5, wherein the second custom logic block, the custom logic block, and the processor core are operable to process instructions simultaneously.

7. The programmable chip of claim 1, wherein the custom logic block is configured to perform a floating point add.

8. The programmable chip of claim 1, wherein the processor core comprises an arithmetic logic unit and a multiply accumulate unit.

9. The programmable chip of claim 8, wherein the processor core is operable to receive values from four different registers.

10. The programmable chip of claim 9, wherein the multiply accumulate unit is operable to take values from two of the four different registers.

11. The programmable chip of claim 9, wherein the arithmetic logic unit is operable to take values from two of the four different registers.

12. The programmable chip of claim 9, wherein the custom logic block is operable to take values from four different registers.

13. The programmable chip of claim 9, wherein the outputs of the multiply accumulate unit, arithmetic logic unit, and the custom logic block are coupled to multiplexers to identify a multiply accumulate result and an arithmetic logic unit result.

14. A method for processing custom instructions, the method comprising:
    receiving a plurality of supported instructions and custom instructions at a processor core of a programmable chip;
    calling a custom logic block integrated on the programmable chip when a custom trigger instruction is received while processing supported instructions simultaneously, wherein the custom logic block is operable to execute one or more custom instructions, wherein the processor distinguishes supported instructions from custom instructions by snooping a program counter address, wherein the processor core is an address generation unit and the custom logic block is a custom address generation unit configured to calculate zigzag scanning addresses for MPEG encoding.

15. The method of claim 14, wherein the processor core is configured to wait for a response from the custom logic block when a custom end instruction corresponding to the custom trigger instruction is received.

16. The method of claim 14, wherein supported instructions are processed by the processor core and custom instructions are processed by the custom logic block in parallel.

17. The method of claim 14, further comprising a second custom logic block operable to perform one or more custom instructions.

18. The method of claim 17, wherein the processor core is operable to call the second custom logic block when a second custom trigger instruction is identified.

19. The method of claim 18, wherein the second custom logic block, the custom logic block, and the processor core are operable to process instructions simultaneously.

20. The method of claim 14, wherein the custom logic block is configured to perform a floating point operation.

21. The method of claim 14, wherein the processor core comprises an arithmetic logic unit and a multiply accumulate unit.

22. The method of claim 21, wherein the processor core is operable to receive values from four different registers.

23. A device for processing custom instructions, the device comprising:

means for receiving a plurality of supported instructions and custom instructions at a processor core of a programmable chip;

means for calling a custom logic block integrated on the programmable chip when a custom trigger instruction is received while processing supported instructions simultaneously, wherein the custom logic block is operable to execute one or more custom instructions, wherein the processor distinguishes supported instructions from custom instructions by snooping a program counter address, wherein the processor core is an address generation unit and the custom logic block is a custom address generation unit configured to calculate zigzag scanning addresses for MPEG encoding.

24. The device of claim 23, wherein the processor core is configured to wait for a response from the custom logic block when a custom end instruction corresponding to the custom trigger instruction is received.

25. The device of claim 23, wherein supported instructions are processed by the processor core and custom instructions are processed by the custom logic block in parallel.

26. The device of claim 23, further comprising a second custom logic block operable to perform one or more custom instructions.

27. The device of claim 26, wherein the processor core is operable to call the second custom logic block when a second custom trigger instruction is identified.

28. The device of claim 27, wherein the second custom logic block, the custom logic block, and the processor core are operable to process instructions simultaneously.

29. The device of claim 23, wherein the custom logic block is configured to perform a floating point operation.

* * * * *